United States Patent
Beinlich

(10) Patent No.: US 9,899,905 B2
(45) Date of Patent: Feb. 20, 2018

(54) RIPPLE COMPENSATION CIRCUIT OF POWER SUPPLY AND COMPENSATION METHOD THEREOF

(71) Applicant: DET International Holding Limited, George Town, Grand Cayman (KY)

(72) Inventor: Dominik Reinhard Beinlich, Amphur Muang (TH)

(73) Assignee: DET INTERNATIONAL HOLDING LIMITED, George Town (KY)

( * ) Notice: Subject to any disclaimer, the term of this patent is extended or adjusted under 35 U.S.C. 154(b) by 0 days.

(21) Appl. No.: 15/182,979

(22) Filed: Jun. 15, 2016

(65) Prior Publication Data

US 2017/0366081 A1 Dec. 21, 2017

(51) Int. Cl.
*H02M 7/155* (2006.01)
*H02M 1/14* (2006.01)
(Continued)

(52) U.S. Cl.
CPC ......... *H02M 1/143* (2013.01); *H02M 1/4241* (2013.01); *H02M 7/04* (2013.01)

(58) Field of Classification Search
CPC ................................ H02M 7/04; H02M 7/155
(Continued)

(56) References Cited

U.S. PATENT DOCUMENTS 5,410,466 A * 4/1995 Maehara ............... H02M 1/425
315/224
5,642,412 A * 6/1997 Reymond ........... H04M 19/005
363/125

(Continued)

FOREIGN PATENT DOCUMENTS

TW 201503556 1/2015
TW 201517482 5/2015
(Continued)

OTHER PUBLICATIONS

R.Teodorescu, et al., Proportional-resonant controllers and filters for grid-connected voltage-source converters; IEE Proc.-Electr. Power Appl., vol. 153, No. 5, Sep. 2006; The Institution of Engineering and Technology.

(Continued)

*Primary Examiner* — Adolf Berhane
*Assistant Examiner* — Nusrat Quddus
(74) *Attorney, Agent, or Firm* — Kirton McConkie; Evan R. Witt

(57) ABSTRACT

A compensating method for a ripple compensation circuit of a power supply is provided. The power supply includes an LLC resonant converter. The LLC resonant converter receives an input voltage and generates an output voltage. Firstly, the output voltage is subtracted from a reference voltage, so that a first error signal is generated. Then, a digital filter is provided to increase a low frequency gain of the first error signal, so that a second error signal is generated. Then, the first error signal and the second signal are added, so that a modulated error signal is generated. Then, a compensation signal is generated to control the LLC resonant converter according to the modulated error signal. Consequently, a low frequency gain of the input voltage is increased and a low frequency ripple of the output voltage is suppressed by an increased voltage loop compensator response.

9 Claims, 14 Drawing Sheets

(51) Int. Cl.
*H02M 7/04* (2006.01)
*H02M 1/42* (2007.01)

(58) Field of Classification Search
USPC .................. 363/21.02, 44–49, 123–127
See application file for complete search history.

(56) References Cited

U.S. PATENT DOCUMENTS

| | | | |
|---|---|---|---|
| 6,185,117 B1 * | 2/2001 | Courier De Mere | H02M 1/4208 363/125 |
| 6,424,101 B1 * | 7/2002 | Sabate | H02M 7/53803 315/224 |
| 7,355,354 B2 * | 4/2008 | Rust | H05B 41/2824 315/209 R |
| 7,554,310 B2 * | 6/2009 | Chapuis | H02M 3/157 323/282 |
| 8,135,339 B2 * | 3/2012 | Ranson | H04B 7/15 455/24 |
| 8,427,847 B2 * | 4/2013 | Halberstadt | H02M 3/3376 363/17 |
| 9,083,242 B2 * | 7/2015 | Barnett | H02M 3/285 |
| 9,379,628 B2 * | 6/2016 | Zambetti | H02M 3/33546 |
| 9,509,254 B1 * | 11/2016 | Cripe | H02M 7/537 |
| 2004/0046456 A1 | 3/2004 | Tracy et al. | |
| 2007/0210777 A1 | 9/2007 | Cervera et al. | |
| 2008/0084167 A1 * | 4/2008 | Waffenschmidt | H02M 3/337 315/210 |
| 2009/0322439 A1 * | 12/2009 | Mayer | H03C 3/04 332/118 |
| 2010/0172168 A1 * | 7/2010 | Fells | H02J 7/025 363/164 |
| 2011/0103097 A1 * | 5/2011 | Wang | H02M 3/33592 363/17 |
| 2011/0157920 A1 * | 6/2011 | Adragna | H02M 3/3376 363/21.03 |
| 2012/0098346 A1 * | 4/2012 | Garrity | H02J 3/383 307/82 |
| 2012/0176817 A1 * | 7/2012 | Lu | H02M 3/285 363/21.02 |
| 2012/0327692 A1 * | 12/2012 | Cantoro | H02M 3/3387 363/21.03 |
| 2014/0029318 A1 * | 1/2014 | Chen | H02M 1/12 363/44 |
| 2014/0091720 A1 | 4/2014 | Brinlee | |
| 2015/0229225 A1 * | 8/2015 | Jang | H02M 3/285 363/17 |
| 2016/0172843 A1 * | 6/2016 | Guo | H02M 3/3376 363/21.02 |

FOREIGN PATENT DOCUMENTS

| | | |
|---|---|---|
| TW | 201543793 | 11/2015 |
| TW | I521841 | 2/2016 |

OTHER PUBLICATIONS

Concettina Buccella, et al., Observer-Based Control of LLC DC/DC Resonant Converter Using Extended Describing Functions; IEEE Transactions on Power Electronics, vol. 30, No. 10, Oct. 2005.

Chaohui Liu, et al., Current Ripple Reduction in 4kW LLC Resonant Converter Based Battery Charger for Electric Vehicles; Department of Electronic and Electrical Engineering, University of Sheffield, 2015; Sheffield, United Kingdom.

* cited by examiner

RIPPLE COMPENSATION CIRCUIT OF POWER SUPPLY AND COMPENSATION METHOD THEREOF

FIELD OF THE INVENTION

The present invention relates to a ripple compensation circuit, and more particularly to a ripple compensation circuit of a power supply and a compensating method thereof.

BACKGROUND OF THE INVENTION

A power supply is an electronic device that is widely used in daily life. Generally, an electric appliance has a power supply for providing electric power to internal electronic components of the electric appliance. For example, an AC/DC power supply usually comprises a power factor correction (PFC) circuit and an LLC resonant converter. After an AC voltage (e.g., from a utility power source) is received by the PFC circuit and the power factor of the AC voltage is corrected by the PFC circuit, a transition DC voltage is outputted. The LLC resonant converter is used for resonantly converting the transition DC voltage into an output DC voltage with a desired voltage level.

However, during operation of the AC/DC power supply, the received AC voltage has a low frequency (e.g., the 90-120 Hz ripple). Consequently, the transition DC voltage from the PFC circuit and the output DC voltage from the LLC resonant converter also contain low frequency ripples. These low frequency ripples may result in additional power loss, cause abnormal operation of the AC/DC power supply, or even generate noise and undesired sound.

Conventionally, the AC/DC power supply with the LLC resonant converter uses an analog filtering approach for inhibiting the low frequency ripple. That is, an analog filtering circuit such as an RC filtering circuit or an LC filtering circuit is connected to an output terminal of the LLC resonant converter. The analog filtering circuit is used for filtering off the low frequency ripple that is contained in the output DC voltage from the LLC resonant converter. After the resistance, capacitance and/or inductance of associated components of the AC/DC power supply are calculated and specially designed, the analog filtering circuit can effectively inhibit the low frequency ripple to a certain extent. However, the use of the analog filtering circuit increases the fabricating cost of the AC/DC power supply and occupies the layout space of the AC/DC power supply.

For solving the problem of using the analog filtering circuit, a conventional method is directed to increase the gain value of the LLC input voltage at the low frequency in order to reduce the low frequency ripple of the AC/DC power supply output voltage. In accordance with this method, the LLC output voltage and the gain value of a gain filter are multiplied to generate a gain signal and increase the gain value of the LLC output voltage at the low frequency, and the LLC input voltage is compensated by the gain signal to increase the gain value of the LLC input voltage at the low frequency. FIG. 1A is a plot illustrating the relationship between the gain value of the LLC input voltage and the frequency after compensated by the gain signal. FIG. 1B is a plot illustrating the relationship between the phase of the LLC input voltage and the frequency after compensated by the gain signal. However, since the LLC output voltage and the gain value of a gain filter are multiplied to increase the gain value of the LLC input voltage at the low frequency, the zero and pole locations are changed. If the LLC input voltage is directly compensated by the gain signal with the changed zero and pole locations, a significant phase impact occurs. Please refer to the circumscribed zone A of FIG. 1A. After the LLC input voltage is compensated by the gain signal, the gain value of the LLC input voltage at the frequency of about 100 Hz is increased. However, the circumscribed zone A' as shown in FIG. 1B indicates that the increase of the gain value results in a phase impact of about 90 degrees to about −90 degrees. Because of the significant phase impact, the AC/DC power supply is unstable.

Therefore, there is a need of providing a ripple compensation circuit of a power supply and a compensating method thereof in order to overcome the above drawbacks.

SUMMARY OF THE INVENTION

The present invention provides a ripple compensation circuit of a power supply and a compensating method thereof. By the ripple compensation circuit, the low frequency gain of the LLC input voltage is increased, the low frequency ripple is suppressed, and the phase impact is decreased. Consequently, the stability of the power supply can be maintained. Moreover, the use of the ripple compensation circuit can reduce the inner space and the fabricating cost of the power supply.

In accordance with an aspect of the present invention, there is provided a ripple compensation circuit of a power supply. The power supply includes an LLC resonant converter. An input terminal of the LLC resonant converter receives an input voltage. An output terminal of the LLC resonant converter generates an output voltage. The ripple compensation circuit includes a subtracter, a digital filter, an adder, and a voltage loop compensation circuit. An input terminal of the subtracter is connected with the output terminal of the LLC resonant converter. The subtracter receives the output voltage and a reference voltage. After the output voltage is subtracted from the reference voltage, the subtracter outputs a first error signal. An input terminal of the digital filter is connected with an output terminal of the subtracter and receives the first error signal. After the first error signal is processed by the digital filter, a gain of the first error signal at low frequency is increased, so that a second error signal is outputted from the digital filter. An input terminal of the adder is connected with the output terminal of the subtracter and an output terminal of the digital filter. After the first error signal and the second error signal are added, a modulated error signal is outputted from the adder. An input terminal of the voltage loop compensation circuit is connected with an output terminal of the adder. An output terminal of the voltage loop compensation circuit is connected with the LLC resonant converter. The voltage loop compensation circuit generates a compensation signal to control the LLC resonant converter according to the modulated error signal, so that a low frequency gain of the input voltage is increased and a low frequency ripple of the output voltage is suppressed by an increased voltage loop compensator response.

In accordance with another aspect of the present invention, there is provided a compensating method for a ripple compensation circuit of a power supply. The power supply includes an LLC resonant converter. An input terminal of the LLC resonant converter receives an input voltage. An output terminal of the LLC resonant converter generates an output voltage. The compensating method includes the following steps. Firstly, the output voltage is subtracted from a reference voltage, so that a first error signal is generated. Then, a digital filter is provided to increase a gain of the first error signal at low frequency, so that a second error signal is generated. Then, the first error signal and the second signal are added, so that a modulated error signal is generated. Then, a compensation signal is generated to control the LLC resonant converter according to the modulated error signal. Consequently, a low frequency gain of the input voltage is increased and a low frequency ripple of the output voltage is suppressed.

In accordance with another aspect of the present invention, there is provided a power supply. The power supply includes an LLC resonant converter and a ripple compensation circuit. An input terminal of the LLC resonant converter receives an input voltage. An output terminal of the LLC resonant converter generates an output voltage. The ripple compensation circuit includes a subtracter, a digital filter, an adder, and a voltage loop compensation circuit. An input terminal of the subtracter is connected with the output terminal of the LLC resonant converter. The subtracter receives the output voltage and a reference voltage. After the output voltage is subtracted from the reference voltage, the subtracter outputs a first error signal. An input terminal of the digital filter is connected with an output terminal of the subtracter and receives the first error signal. After the first error signal is processed by the digital filter, a gain of the first error signal at low frequency is increased, so that a second error signal is outputted from the digital filter. An input terminal of the adder is connected with the output terminal of the subtracter and an output terminal of the digital filter. After the first error signal and the second error signal are added, a modulated error signal is outputted from the adder. An input terminal of the voltage loop compensation circuit is connected with an output terminal of the adder. An output terminal of the voltage loop compensation circuit is connected with the LLC resonant converter. The voltage loop compensation circuit generates a compensation signal to control the LLC resonant converter according to the modulated error signal so that a low frequency gain of the input voltage is increased and a low frequency ripple of the output voltage is suppressed by an increased voltage loop compensator response.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
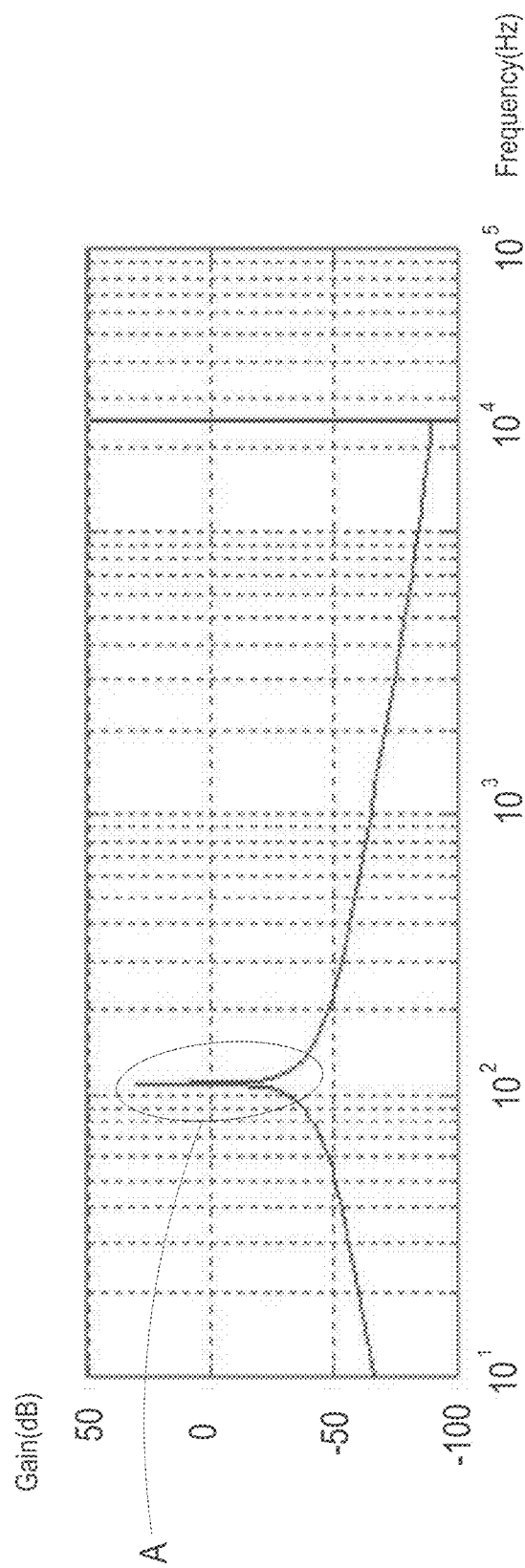
FIG. 1A is a plot illustrating the relationship between the gain value of the LLC input voltage and the frequency after compensated by the gain signal.
Figure 1B:
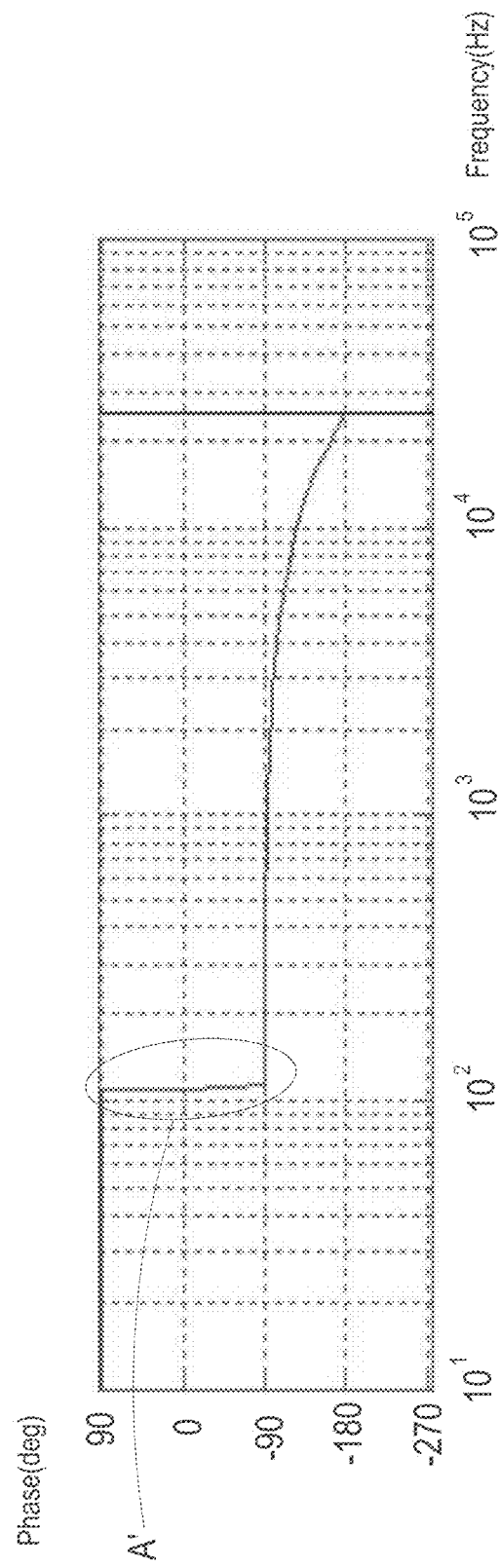
FIG. 1B is a plot illustrating the relationship between the phase of the LLC input voltage and the frequency after compensated by the gain signal.
Figure 2:
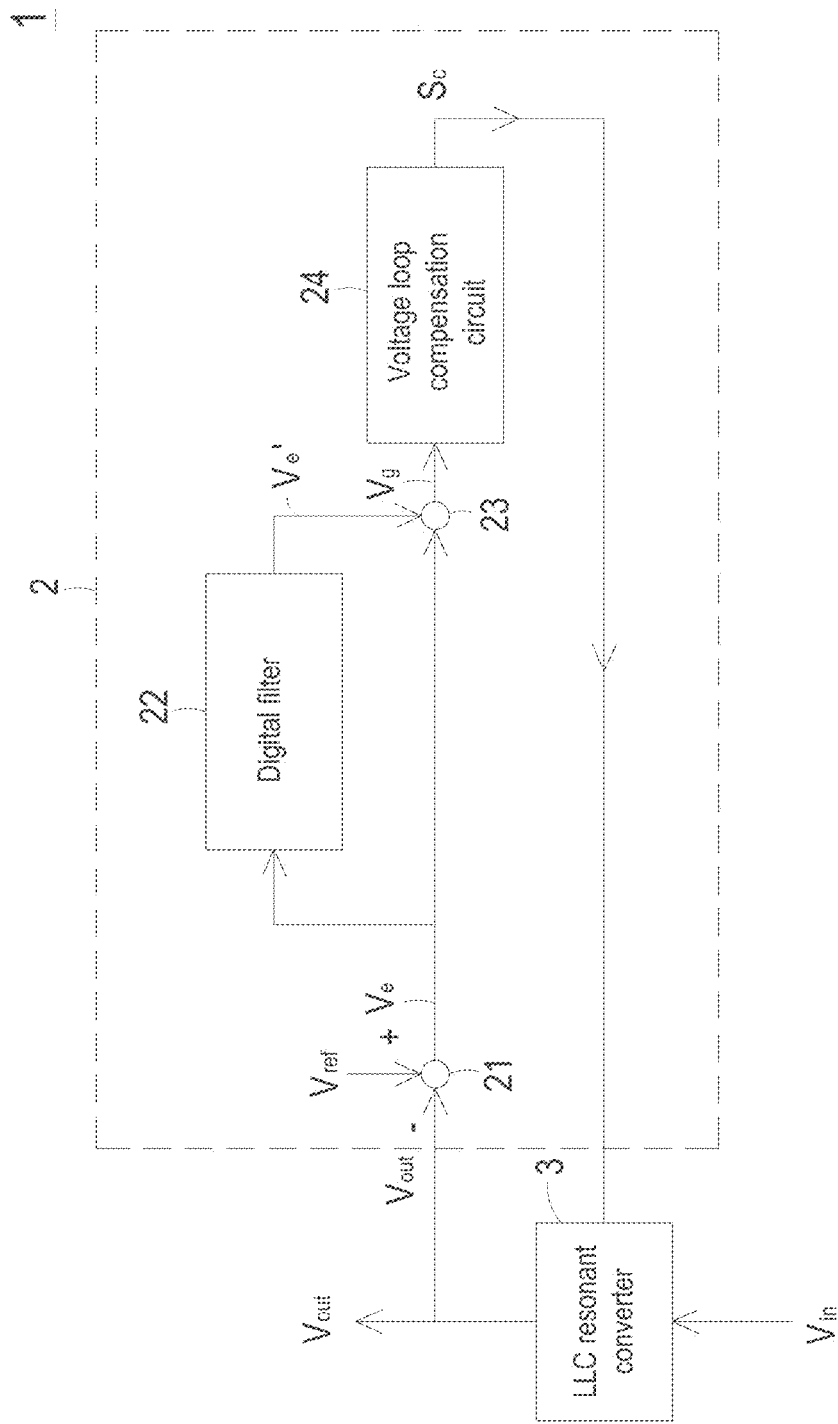
FIG. 2 is a schematic functional block diagram illustrating a ripple compensation circuit of a power supply according to an embodiment of the present invention.

FIG. 2 is a schematic functional block diagram illustrating a ripple compensation circuit of a power supply according to an embodiment of the present invention. The ripple compensation circuit 2 is applied to the power supply 1. An example of the power supply 1 includes but is not limited to an AC/DC power supply. The power supply 1 comprises an LLC resonant converter 3. The LLC resonant converter 3 is used for resonantly converting an input voltage Vin into an output voltage Vout. The output voltage Vout is provided to a load (not shown), which is electrically connected with the power supply 1. For example, the load is an electric appliance.

As shown in FIG. 2, the ripple compensation circuit 2 comprises a subtracter 21, a digital filter 22, an adder 23 and a voltage loop compensation circuit 24. The input terminal of the subtracter 21 is connected with the output terminal of the LLC resonant converter 3. The subtracter 21 receives the output voltage Vout from the LLC resonant converter 3 and a reference voltage Vref. After the output voltage Vout is subtracted from the reference voltage Vref, the subtracter 21 outputs a first error signal Ve.

The input terminal of the digital filter 22 is connected with the output terminal of the subtracter 21. A z-domain transfer function is stored in the digital filter 22. After the first error signal Ve is received by the digital filter 22 and processed by the z-domain transfer function, the gain value of the first error signal Ve at the low frequency is increased. Consequently, a second error signal Ve' is outputted from the digital filter 22. In one embodiment, the gain value at the low frequency is a voltage gain at the frequency of 90 Hz~120 Hz.

Figure 3:
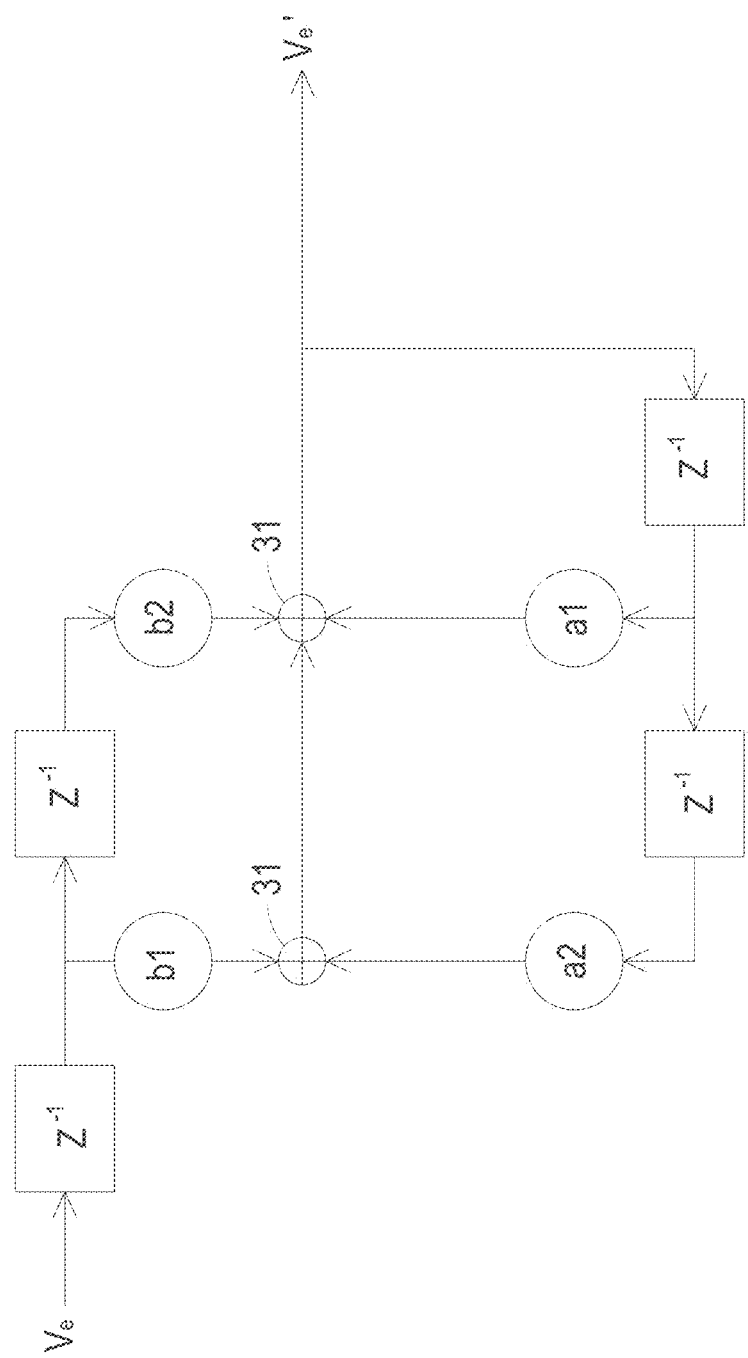
FIG. 3 schematically illustrates the architecture of the z-domain transfer function in the digital filter of the ripple compensation circuit of FIG. 2.

FIG. 3 schematically illustrates the architecture of the z-domain transfer function in the digital filter of the ripple compensation circuit of FIG. 2. An example of the digital filter 22 includes but is not limited to an infinite impulse response (IIR) filter. The z-domain transfer function in the IIR filter may be expressed by the mathematic formula (1):

$$H(z) = \frac{v_{e'}}{v_e} = \frac{b_1 \cdot z^{-1} + b_2 \cdot z^{-2}}{1 + a_1 \cdot z^{-1} + a_2 \cdot z^{-2}} \quad (1)$$

In the mathematic formula (1), H(z) is the z-domain transfer function, Ve is the first error signal, Ve' is the second error signal, a1, a2, b1 and b2 are filter coefficients of the IIR filter, $z^{-1}$ is a first delay element, and $z^{-2}$ is a second delay element that is the result of the multiplication of two first delay elements $z^{-1}$. The mathematic formula (1) can be implemented by using the architecture of FIG. 3. In FIG. 3, the numeral reference 31 denotes the adder. After the first error signal Ve and the second error signal Ve' are processed by the IIR filter according to the filter coefficients a1, a2, b1 and b2, the first delay element $z^{-1}$ and the adder 31, the z-domain transfer function H(z) is obtained. Moreover, the pole location of the filter may be adjusted according to the coefficients a1 and a2, and the zero location of the filter may be adjusted according to the coefficients b1 and b2. Consequently, the filter with different gain values at different frequencies can be designed by adjusting the filter coefficients a1, a2, b1 and b2. For example, by adjusting the filter coefficients of the z-domain transfer function H(z), the voltage gain at the frequency of 90 Hz~120 Hz is increased. The ways of adjusting the filter coefficients are well known to those skilled in the art, and are not redundantly described herein.

Please refer to FIG. 2 again. The input terminal of the adder 23 is connected with the output terminal of the subtracter 21 and the output terminal of the digital filter 22. The first error signal Ve from the subtracter 21 and the second error signal Ve' from the digital filter 22 are received by the adder 23. After the first error signal Ve and the second error signal Ve' are added, a modulated error signal Vg is outputted from the adder 23.

The input terminal of the voltage loop compensation circuit 24 is connected with the output terminal of the adder 23. The output terminal of the voltage loop compensation circuit 24 is connected with the LLC resonant converter 3. The voltage loop compensation circuit 24 receives the modulated error signal Vg from the adder 23, and generates a compensation signal Sc to control the LLC resonant converter 3 according to the modulated error signal Vg. Due to the compensation signal Sc, the gain value of the input voltage Vin at the low frequency is increased. Since the gain value of the input voltage Vin at the low frequency is increased, the low frequency ripple of the output voltage Vout can be effectively suppressed by an increased voltage loop compensator response.

Figure 4:
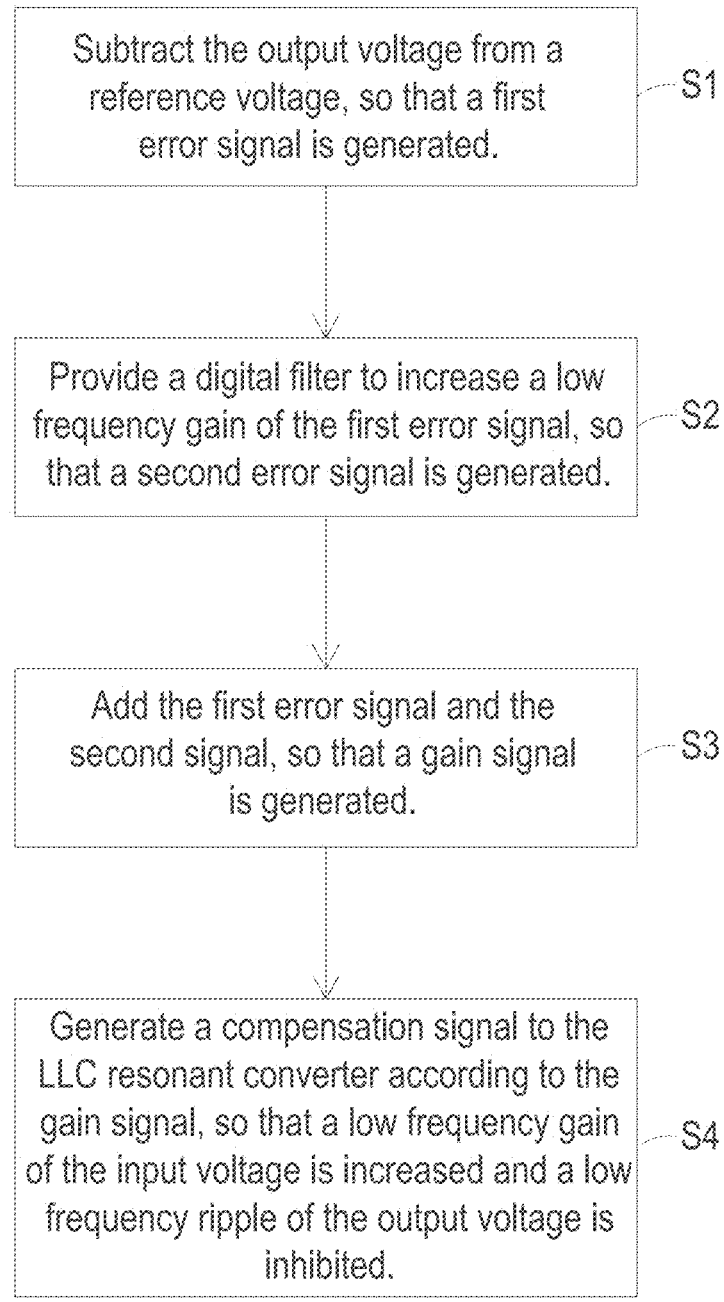
FIG. 4 is a flowchart illustrating a compensating method for a ripple compensation circuit of a power supply according to an embodiment of the present invention.

FIG. 4 is a flowchart illustrating a compensating method for a ripple compensation circuit of a power supply according to an embodiment of the present invention. Please refer to FIGS. 2 and 4. The compensating method comprises the following steps. Firstly, in a step S1, the output voltage Vout from the LLC resonant converter 3 and a reference voltage Vref are received. After the output voltage Vout is subtracted from the reference voltage Vref, a first error signal Ve is generated. Then, in a second step S2, the first error signal Ve is received by the digital filter 22 and processed by the z-domain transfer function of the digital filter 22, so that the gain value of the first error signal Ve at the low frequency is increased. Consequently, a second error signal Ve' is outputted from the digital filter 22. In a step S3, the first error signal Ve and the second error signal Ve' are received by the adder 23. After the first error signal Ve and the second error signal Ve' are added, a modulated error signal Vg is outputted from the adder 23. In a step S4, voltage loop compensation circuit 24 receives the modulated error signal Vg from the adder 23, and generates a compensation signal Sc to control the LLC resonant converter 3 according to the modulated error signal Vg. Due to the compensation signal Sc, the gain value of the input voltage Vin at the low frequency is increased. Since the gain value of the input voltage Vin at the low frequency is increased, the low frequency ripple of the output voltage Vout can be effectively suppressed.

Figure 5A:
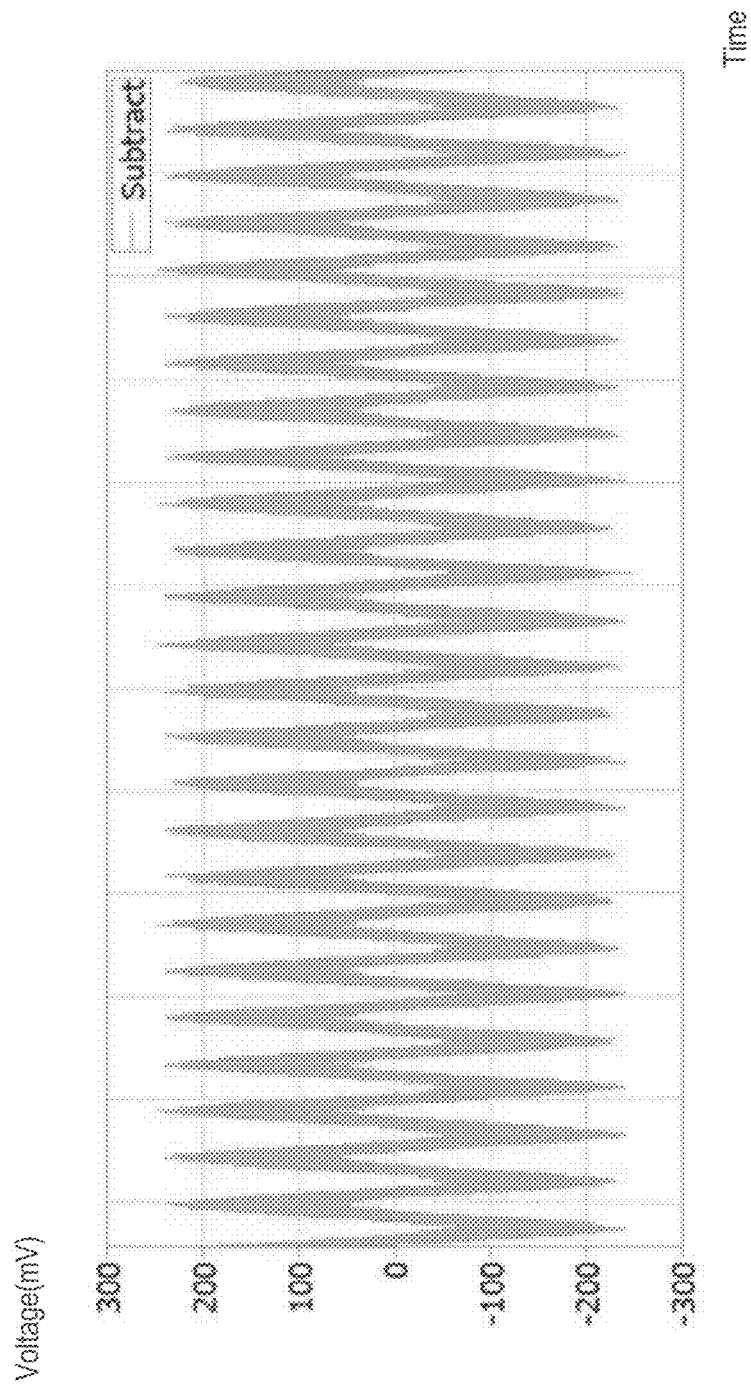
FIG. 5A is a schematic timing waveform diagram illustrating the simulation result of the voltage of the first error signal in the ripple compensation circuit of FIG. 2.
Figure 5B:
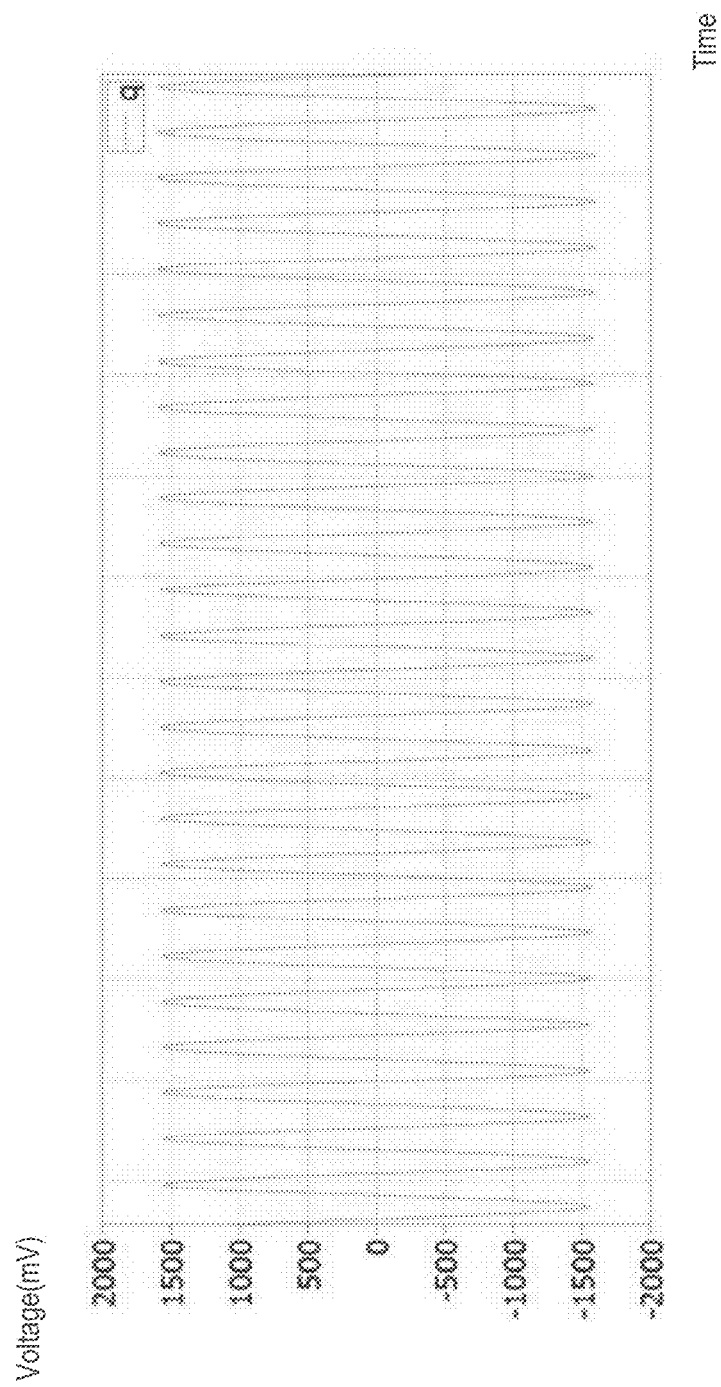
FIG. 5B is a schematic timing waveform diagram illustrating the simulation result of the voltage of the second error signal in the ripple compensation circuit of FIG. 2.
Figure 5C:
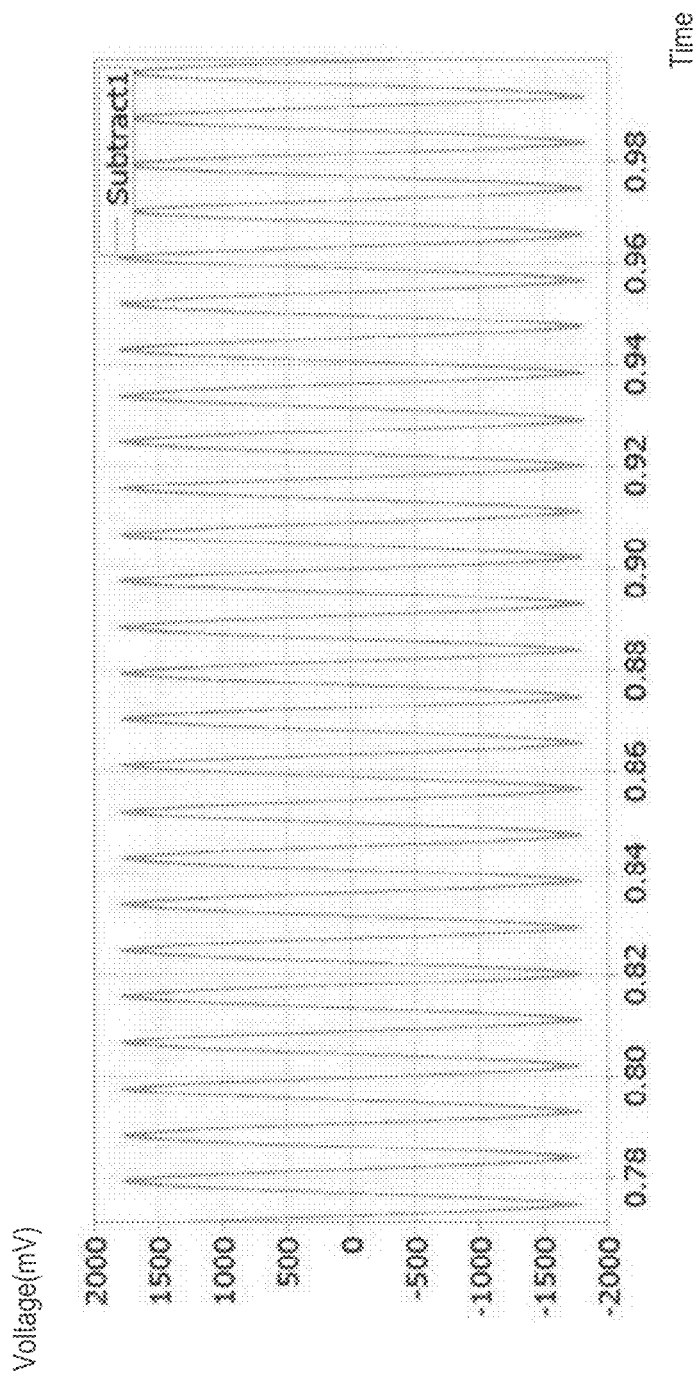
FIG. 5C is a schematic timing waveform diagram illustrating the simulation result of the voltage of the modulated error signal in the ripple compensation circuit of FIG. 2.

FIG. 5A is a schematic timing waveform diagram illustrating the simulation result of the voltage of the first error signal in the ripple compensation circuit of FIG. 2. FIG. 5B is a schematic timing waveform diagram illustrating the simulation result of the voltage of the second error signal in the ripple compensation circuit of FIG. 2. FIG. 5C is a schematic timing waveform diagram illustrating the simulation result of the voltage of the modulated error signal in the ripple compensation circuit of FIG. 2. By comparing the result of FIG. 5A with the result of FIG. 5B, it is found that the user of the digital filter 22 can increase the gain of the first error signal Ve at low frequency. Consequently, after the first error signal Ve and the second error signal Ve' are added to generate the modulated error signal Vg, the low frequency ripple of the output voltage Vout can be effectively suppressed.

Figure 6A:
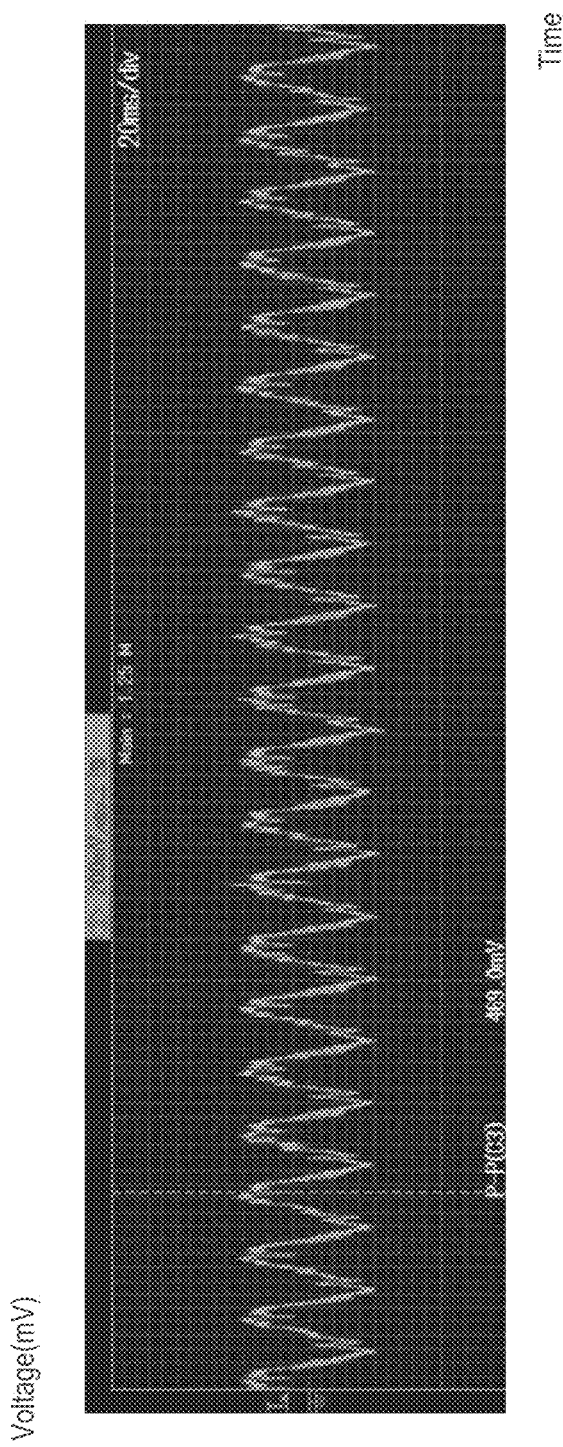
FIG. 6A is a schematic timing waveform diagram illustrating the simulation result of the LLC output voltage without using the ripple compensation circuit of the present invention.
Figure 6B:
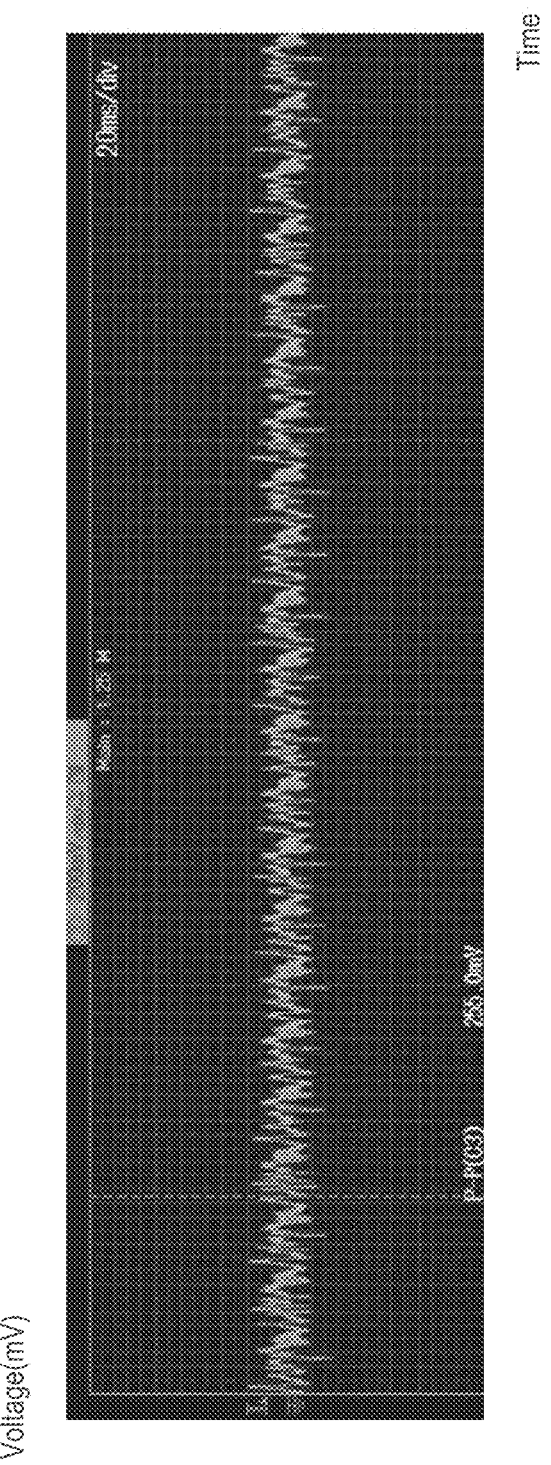
FIG. 6B is a schematic timing waveform diagram illustrating the simulation result of the LLC output voltage when using the ripple compensation circuit of the present invention.

FIG. 6A is a schematic timing waveform diagram illustrating the simulation result of the LLC output voltage without using the ripple compensation circuit of the present invention. FIG. 6B is a schematic timing waveform diagram illustrating the simulation result of the LLC output voltage when using the ripple compensation circuit of the present invention. In case that the ripple compensation circuit 2 is not employed, the peak-to-peak value of the low frequency ripple in the LLC output voltage is about 469 mV (see FIG. 6A). Whereas, in case that the ripple compensation circuit 2 is employed, the peak-to-peak value in the low frequency ripple of the LLC output voltage is about 259 mV (see FIG. 6B). Obviously, the ripple compensation circuit 2 is capable of effectively suppressing the low frequency ripple.

Figure 7A:
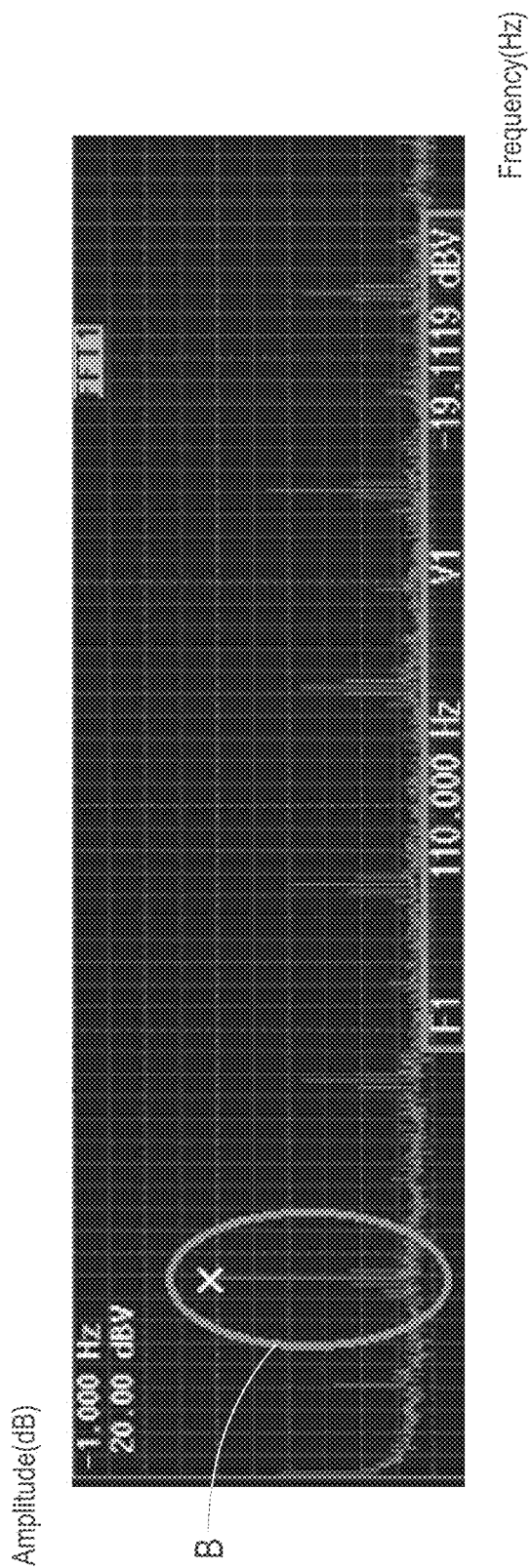
FIG. 7A is simulation result about the ripple amplitude spectrum of the LLC output voltage without using the ripple compensation circuit of the present invention.
Figure 7B:
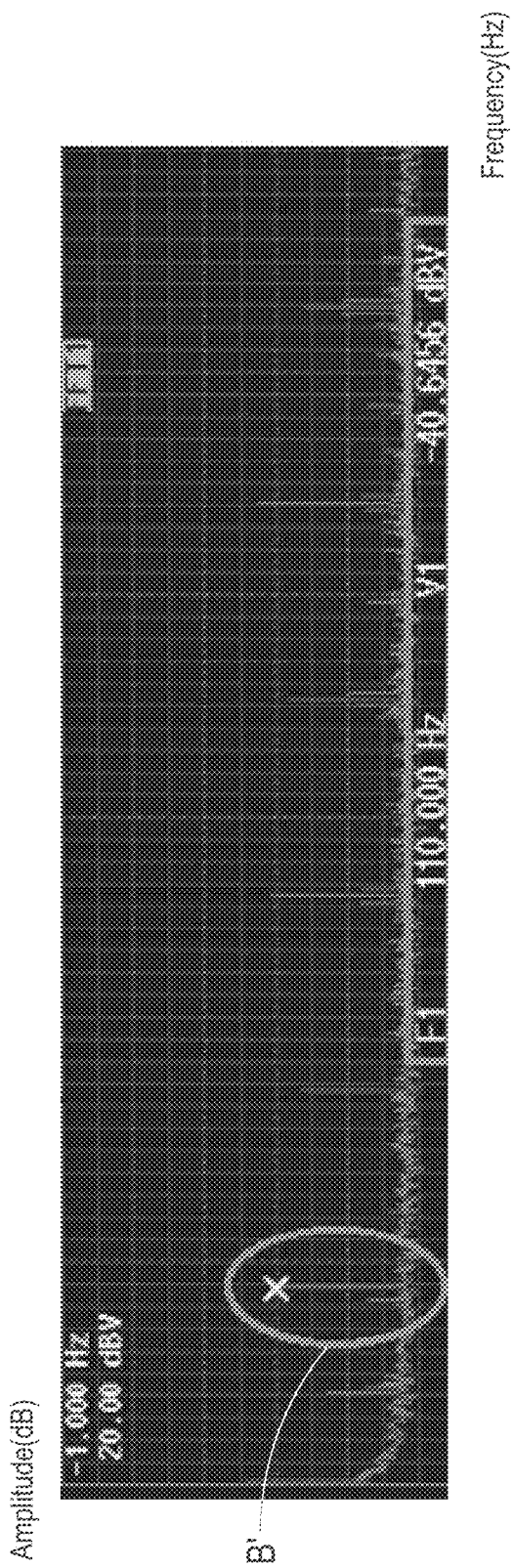
FIG. 7B is simulation result about the ripple amplitude spectrum of the LLC output voltage when using the ripple compensation circuit of the present invention.

FIG. 7A is simulation result about the ripple amplitude spectrum of the LLC output voltage without using the ripple compensation circuit of the present invention. FIG. 7B is simulation result about the ripple amplitude spectrum of the LLC output voltage when using the ripple compensation circuit of the present invention. In case that the ripple compensation circuit 2 is not employed, the amplitude of the low frequency ripple in the LLC output voltage is about −19 dB at 110 Hz (see the circumscribed zone B of FIG. 7A). Whereas, in case that the ripple compensation circuit 2 is employed, the amplitude of the low frequency ripple in the LLC output voltage is decreased to −40.6 dB at 110 Hz (see the circumscribed zone B' of FIG. 7B). Obviously, the ripple compensation circuit 2 is capable of effectively suppressing the low frequency ripple.

Figure 8A:
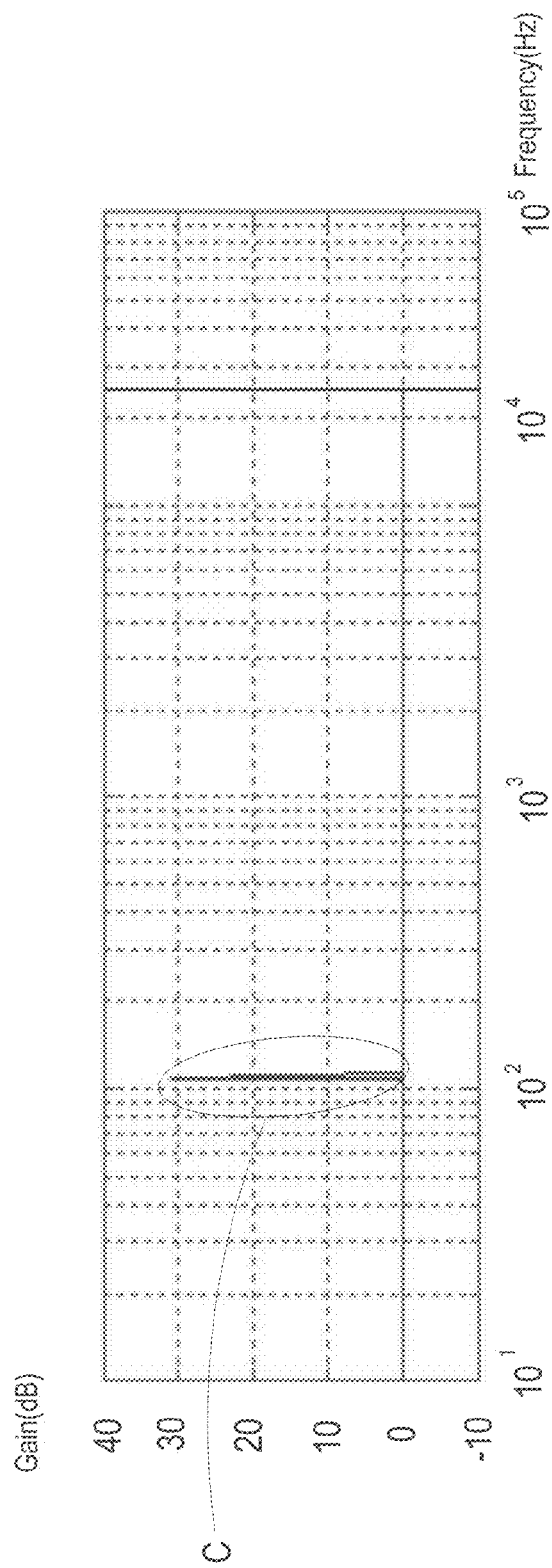
FIG. 8A is a plot illustrating the relationship between the gain value of the LLC input voltage and the frequency after compensated by the ripple compensation circuit of the present invention.
Figure 8B:
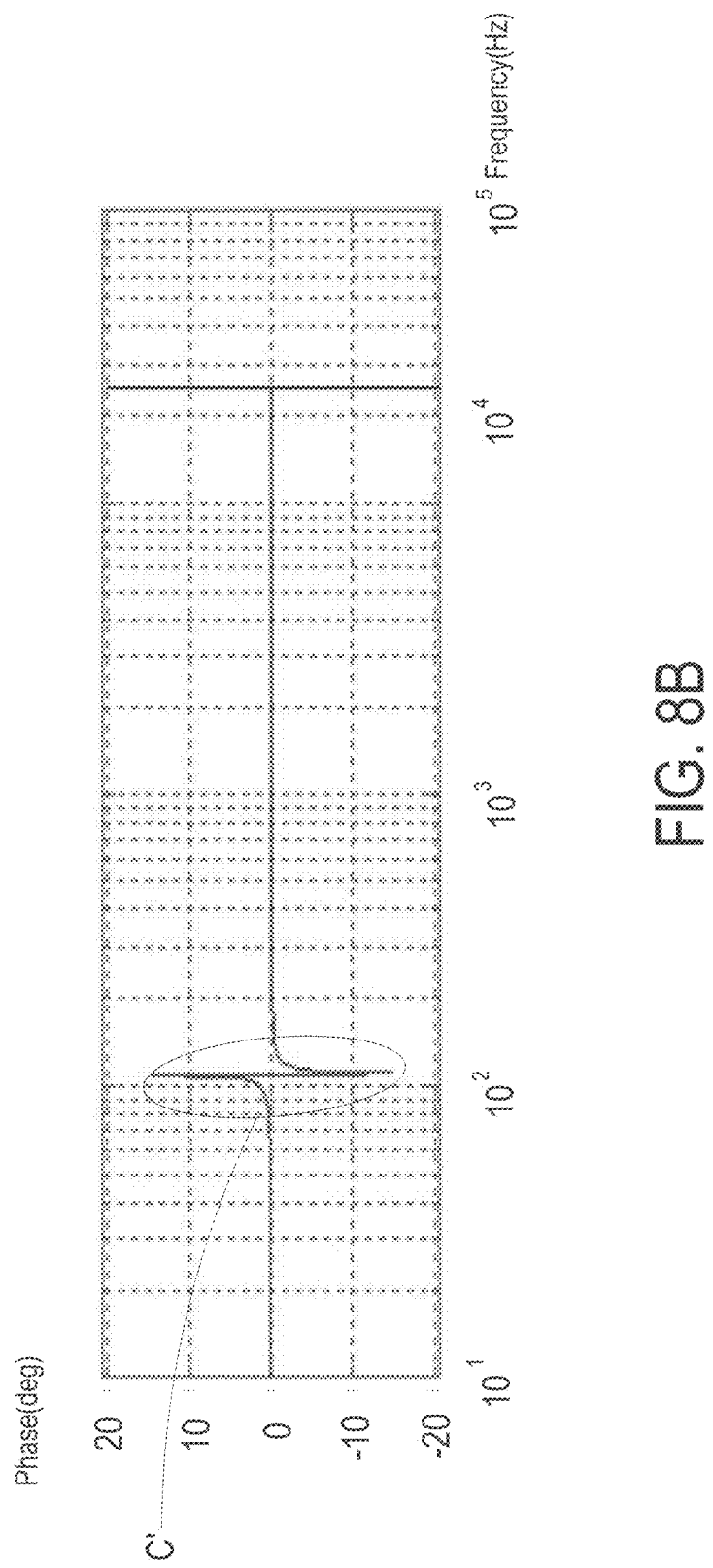
FIG. 8B is a plot illustrating the relationship between the phase of the LLC input voltage and the frequency after compensated by the ripple compensation circuit of the present invention.

FIG. 8A is a plot illustrating the relationship between the gain value of the LLC input voltage and the frequency after compensated by the ripple compensation circuit of the present invention. FIG. 8B is a plot illustrating the relationship between the phase of the LLC input voltage and the frequency after compensated by the ripple compensation circuit of the present invention. Conventionally, the LLC output voltage and the gain value of a gain filter are multiplied to generate a modulated error signal and increase the gain value of the LLC output voltage at the low frequency, and the LLC input voltage is compensated by the modulated error signal to increase the gain value of the LLC input voltage at the low frequency. Consequently, a significant phase impact occurs. In accordance with the technology of the ripple compensation circuit 2 of the present invention, the gain of the first error signal Ve at low frequency is increased by the digital filter 22 so as to generate the second error signal Ve', then the first error signal Ve and the second error signal Ve' are added to generate the modulated error signal Vg, and finally the input voltage Vin of the LLC resonant converter 3 is compensated by the modulated error signal Vg. Consequently, the impact on the zero and pole locations will be minimized. In other words, after the input voltage Vin of the LLC resonant converter 3 is compensated by the modulated error signal Vg, the phase impact is reduced. Please refer to FIGS. 8A and 8B. After the input voltage Vin of the LLC resonant converter 3 is compensated by the modulated error signal Vg, the gain value of the input voltage Vin at the frequency of about 100 Hz is increased (see the circumscribed zone C of FIG. 8A). Moreover, the circumscribed zone C' as shown in FIG. 8B indicates that the increase of the gain value results in a phase impact of about 15 degrees to about −15 degrees. In other words, the ripple compensation circuit 2 of the present invention can increase the low frequency gain while decreasing the phase impact. Consequently, the ripple compensation circuit 2 of the present invention can suppress the low frequency ripple and maintain the stability of the power supply 1.

In some embodiments, the ripple compensation circuit 2 is included in a microcontroller (not shown) of the power supply 1. The microcontroller is electrically connected with the LLC resonant converter 3 for controlling the LLC resonant converter 3. In case that the ripple compensation circuit 2 is included in the microcontroller, the compensating method can be implemented in a digital manner. Consequently, the low frequency gain of the LLC input voltage is compensated. Under this circumstance, the power supply 1 can directly suppress the low frequency ripple of the LLC input voltage with additional hardware components (e.g., a RC filtering circuit or an LC filtering circuit). Consequently, the inner space of the power supply 1 is saved, and the fabricating cost is reduced. As known, the storage space and the computation resource of the microcontroller are limited. Since the digital filter 22 is a simple but effective low-order filter such as an infinite impulse response filter, higher frequency selectivity is achievable with the lower order filter. Since the required storage space is very low, the use of the digital filter will not obviously consume the storage space and the computation resource of the microcontroller.

From the above descriptions, the present invention provides the ripple compensation circuit and the compensating method. In accordance with the technology of the ripple compensation circuit of the present invention, the gain of the first error signal at low frequency is increased by the digital filter so as to generate the second error signal, then the first error signal and the second error signal are added to generate the modulated error signal, and finally the input voltage of the LLC resonant converter is compensated by the modulated error signal. Consequently, the impact on the zero and pole locations will be minimized. After the input voltage of the LLC resonant converter is compensated by the modulated error signal, the phase impact is reduced. In other words, the ripple compensation circuit of the present invention can suppress the low frequency ripple and maintain the stability of the power supply.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A ripple compensation circuit of a power supply, the power supply comprising an LLC resonant converter, an input terminal of the LLC resonant converter receiving an input voltage, an output terminal of the LLC resonant converter generating an output voltage, the ripple compensation circuit comprising:
    a subtracter, wherein an input terminal of the subtracter is connected with the output terminal of the LLC resonant converter, and the subtracter receives the output voltage and a reference voltage, wherein after the output voltage is subtracted from the reference voltage, the subtracter outputs a first error signal;
    a digital filter, wherein an input terminal of the digital filter is connected with an output terminal of the subtracter and receives the first error signal, wherein after the first error signal is processed by the digital filter, a gain of the first error signal at a low frequency is increased, so that a second error signal is outputted from the digital filter;
    an adder, wherein an input terminal of the adder is connected with the output terminal of the subtracter and an output terminal of the digital filter, wherein after the first error signal and the second error signal are added, a modulated error signal is outputted from the adder; and
    a voltage loop compensation circuit, wherein an input terminal of the voltage loop compensation circuit is connected with an output terminal of the adder, and an output terminal of the voltage loop compensation circuit is connected with the LLC resonant converter, wherein the voltage loop compensation circuit generates a compensation signal to control the LLC resonant converter according to the modulated error signal, so that a low frequency gain of the input voltage is increased and a low frequency ripple of the output voltage is suppressed by an increased voltage loop compensator response;
    wherein the digital filter is an infinite impulse response filter, and the infinite impulse response filter has a z-domain transfer function for increasing the gain of the first error signal at the low frequency, and the z-domain transfer function is expressed as:

$$\frac{b_1 \cdot z^{-1} + b_2 \cdot z^{-2}}{1 + a_1 \cdot z^{-1} + a_2 \cdot z^{-2}}$$

where, a1, a2, b1 and b2 are filter coefficients of the infinite impulse response filter, z−1 is a first delay element, and z−2 is a second delay element.

2. The ripple compensation circuit according to claim 1, wherein the power supply further comprises a microcontroller, wherein the microcontroller is electrically connected with the LLC resonant converter for controlling the LLC resonant converter.

3. The ripple compensation circuit according to claim 2, wherein the ripple compensation circuit is included in the microcontroller.

4. The ripple compensation circuit according to claim 1, wherein the gain of the first error signal at the low frequency to be increased by the digital filter is a voltage gain at a frequency of 90 Hz~120 Hz.

5. A compensating method for a ripple compensation circuit of a power supply, the power supply comprising an LLC resonant converter, an input terminal of the LLC resonant converter receiving an input voltage, an output terminal of the LLC resonant converter generating an output voltage, the compensating method comprising steps of:
 (a) subtracting the output voltage from a reference voltage, so that a first error signal is generated;
 (b) providing a digital filter to increase a gain of the first error signal at a low frequency, so that a second error signal is generated;
 (c) adding the first error signal and the second signal, so that a modulated error signal is generated; and
 (d) generating a compensation signal to control the LLC resonant converter according to the modulated error signal, so that a low frequency gain of the input voltage is increased and a low frequency ripple of the output voltage is inhibited;
 wherein the digital filter is an infinite impulse response filter, and the infinite impulse response filter has a z-domain transfer function for increasing the gain of the first error signal at the low frequency, and the z-domain transfer function is expressed as:

$$\frac{b_1 \cdot z^{-1} + b_2 \cdot z^{-2}}{1 + a_1 \cdot z^{-1} + a_2 \cdot z^{-2}}$$

where, a1, a2, b1 and b2 are filter coefficients of the infinite impulse response filter, z−1 is a first delay element, and z−2 is a second delay element.

6. The compensating method according to claim 5, wherein the gain of the first error signal at the low frequency to be increased by the digital filter is a voltage gain at a frequency of 90 Hz~120 Hz.

7. A power supply comprising:
 an LLC resonant converter, wherein an input terminal of the LLC resonant converter receives an input voltage, and an output terminal of the LLC resonant converter generates an output voltage; and
 a ripple compensation circuit, comprising:
 a subtracter, wherein an input terminal of the subtracter is connected with the output terminal of the LLC resonant converter, and the subtracter receives the output voltage and a reference voltage, wherein after the output voltage is subtracted from the reference voltage, the subtracter outputs a first error signal;
 a digital filter, wherein an input terminal of the digital filter is connected with an output terminal of the subtracter and receives the first error signal, wherein after the first error signal is processed by the digital filter, a gain of the first error signal at a low frequency is increased, so that a second error signal is outputted from the digital filter;
 an adder, wherein an input terminal of the adder is connected with the output terminal of the subtracter and an output terminal of the digital filter, wherein after the first error signal and the second error signal are added, a modulated error signal is outputted from the adder; and
 a voltage loop compensation circuit, wherein an input terminal of the voltage loop compensation circuit is connected with an output terminal of the adder, and an output terminal of the voltage loop compensation circuit is connected with the LLC resonant converter, wherein the voltage loop compensation circuit generates a compensation signal to control the LLC resonant converter according to the modulated error signal, so that a low frequency gain of the input voltage is increased and a low frequency ripple of the output voltage is suppressed by an increased voltage loop compensator response;
 wherein the digital filter is an infinite impulse response filter, and the infinite impulse response filter has a z-domain transfer function for increasing the gain of the first error signal at the low frequency, and the z-domain transfer function is expressed as:

$$\frac{b_1 \cdot z^{-1} + b_2 \cdot z^{-2}}{1 + a_1 \cdot z^{-1} + a_2 \cdot z^{-2}}$$

where, a1, a2, b1 and b2 are filter coefficients of the infinite impulse response filter, z−1 is a first delay element, and z−2 is a second delay element.

8. The power supply according to claim 7, further comprising a microcontroller, wherein the microcontroller is electrically connected with the LLC resonant converter for controlling the LLC resonant converter, wherein the ripple compensation circuit is included in the microcontroller.

9. The power supply according to claim 7, wherein the gain of the first error signal at the low frequency to be increased by the digital filter is a voltage gain at a frequency of 90 Hz~120 Hz.

* * * * *